(12) United States Patent
Tom et al.

(10) Patent No.: US 9,290,296 B2
(45) Date of Patent: Mar. 22, 2016

(54) SUBSTANTIALLY RIGID COLLAPSIBLE CONTAINER WITH FOLD PATTERN

(75) Inventors: Glenn Tom, Bloomington, MN (US); Thea Annette Ellingson, Northfield, MN (US); Amy Koland, Eden Prairie, MN (US); Dale Gene Mowrey, Montgomery, MN (US)

(73) Assignee: Advanced Technologies Materials, Inc., Billerica, MA (US)

( * ) Notice: Subject to any disclaimer, the term of this patent is extended or adjusted under 35 U.S.C. 154(b) by 96 days.

(21) Appl. No.: 14/239,151

(22) PCT Filed: Aug. 22, 2012

(86) PCT No.: PCT/US2012/051843
§ 371 (c)(1),
(2), (4) Date: Feb. 17, 2014

(87) PCT Pub. No.: WO2013/028746
PCT Pub. Date: Feb. 28, 2013

(65) Prior Publication Data
US 2014/0209627 A1 Jul. 31, 2014

Related U.S. Application Data

(60) Provisional application No. 61/526,155, filed on Aug. 22, 2011.

(51) Int. Cl.
*B65D 35/56* (2006.01)
*B65D 6/16* (2006.01)
(Continued)

(52) U.S. Cl.
CPC .............. *B65D 11/18* (2013.01); *B29D 22/003* (2013.01); *B65D 1/0292* (2013.01); *B65D 1/40* (2013.01); *B65D 21/08* (2013.01)

(58) Field of Classification Search
CPC ...... B65D 11/18; B65D 11/186; B65D 11/02; B65D 11/1846; B65D 1/0292; B65D 1/40; B65D 1/225; B65D 21/08; B65D 21/086; B65D 37/00; B29D 22/003
USPC ......... 222/1, 105, 92; 264/523; 220/6, 7, 666, 220/907, 9.3, 4.33, 4.28
See application file for complete search history.

(56) References Cited

U.S. PATENT DOCUMENTS 2,893,295 A  7/1959  Magill
3,354,924 A  11/1967  Birrell et al.
(Continued)

FOREIGN PATENT DOCUMENTS

CN  1229394 A  9/1999
EP  18758  11/1980
(Continued)

OTHER PUBLICATIONS

"gusset" Merriam-Webster.com. Merriam-Webster, Jul. 31, 2015.*
(Continued)

*Primary Examiner* — J. Casimer Jacyna
*Assistant Examiner* — Benjamin R Shaw

(57) ABSTRACT

The present disclosure relates to a blow-molded, rigid collapsible container that can be suitable for storage and dispensing systems of practically any size. The rigid collapsible container may be a stand-alone container. The container may be blow-molded as a unitary piece that may include folds or pre-folds that allows the container to collapse into a relatively flat position. In an expanded state, the container may have a generally trapezoidal prism shape.

17 Claims, 13 Drawing Sheets

(51) Int. Cl.
*B65D 21/08* (2006.01)
*B65D 1/40* (2006.01)
*B65D 1/02* (2006.01)
*B29D 22/00* (2006.01)

(56) References Cited

U.S. PATENT DOCUMENTS

| | | | |
|---|---|---|---|
| 3,367,380 A | 2/1968 | Dickey | |
| 3,559,847 A | 2/1971 | Goodrich | |
| 3,926,341 A * | 12/1975 | Lhoest | 222/95 |
| 4,235,346 A | 11/1980 | Liggett | |
| 4,601,390 A | 7/1986 | Rosenthal et al. | |
| 4,696,840 A | 9/1987 | McCullough et al. | |
| 4,790,029 A | 12/1988 | LaFleur et al. | |
| D300,511 S | 4/1989 | Cramer | |
| 4,850,509 A | 7/1989 | Hollenberg | |
| 5,002,193 A * | 3/1991 | Touzani | 215/396 |
| 5,049,349 A | 9/1991 | McCullough et al. | |
| 5,102,010 A | 4/1992 | Osgar et al. | |
| 5,174,458 A * | 12/1992 | Segati | 215/383 |
| 5,176,294 A * | 1/1993 | Della Riva | 222/105 |
| 5,255,808 A * | 10/1993 | Tobler | 220/6 |
| 5,366,102 A | 11/1994 | Bergner et al. | |
| 5,524,789 A | 6/1996 | Jackman | |
| 5,556,005 A * | 9/1996 | Banks | 222/96 |
| 5,609,899 A | 3/1997 | Spector | |
| 5,693,017 A | 12/1997 | Spears et al. | |
| 5,735,423 A | 4/1998 | Black | |
| 5,758,789 A | 6/1998 | Shin et al. | |
| 5,765,708 A | 6/1998 | Fragos | |
| 5,875,921 A | 3/1999 | Osgar et al. | |
| 5,960,993 A | 10/1999 | Mitsui et al. | |
| 5,988,422 A | 11/1999 | Vallot | |
| 6,015,068 A * | 1/2000 | Osgar et al. | 222/400.7 |
| 6,112,928 A | 9/2000 | Black et al. | |
| D433,938 S | 11/2000 | Polan | |
| 6,158,620 A * | 12/2000 | Polan | 222/92 |
| 6,202,898 B1 | 3/2001 | Koch | |
| 6,206,240 B1 | 3/2001 | Osgar et al. | |
| D454,063 S | 3/2002 | Dammers | |
| D454,302 S | 3/2002 | Dammers | |
| 6,431,406 B1 | 8/2002 | Pruett | |
| 6,453,925 B1 | 9/2002 | Kamo | |
| 6,460,730 B1 | 10/2002 | Liedtke | |
| D467,806 S | 12/2002 | Baron et al. | |
| 6,607,097 B2 | 8/2003 | Savage et al. | |
| 6,851,579 B2 | 2/2005 | Savage et al. | |
| 6,984,278 B2 | 1/2006 | Anderson et al. | |
| 7,007,825 B2 | 3/2006 | Crosland et al. | |
| 7,022,058 B2 | 4/2006 | Lee | |
| D532,702 S * | 11/2006 | Berman | D9/708 |
| 7,172,096 B2 | 2/2007 | O'Dougherty | |
| 7,204,950 B2 | 4/2007 | Farha et al. | |
| D586,656 S | 2/2009 | Mount | |
| 7,699,212 B2 | 4/2010 | Turvey et al. | |
| 2003/0141299 A1 | 7/2003 | Amanat et al. | |
| 2004/0053760 A1* | 3/2004 | Lee | 493/255 |
| 2004/0149348 A1 | 8/2004 | Wertenberger | |
| 2006/0032865 A1* | 2/2006 | Ophardt | 222/94 |
| 2006/0037968 A1 | 2/2006 | Brenner | |
| 2006/0263116 A1* | 11/2006 | Katsuyama | 399/258 |
| 2007/0007289 A1 | 1/2007 | Hoberman | |
| 2008/0087676 A1* | 4/2008 | Kasboske | 220/666 |
| 2008/0142467 A1* | 6/2008 | Giles et al. | 215/11.3 |
| 2008/0185380 A1 | 8/2008 | Pritchett et al. | |
| 2008/0298727 A1 | 12/2008 | Edgington et al. | |
| 2009/0020176 A1 | 1/2009 | Hasegawa et al. | |
| 2009/0108027 A1* | 4/2009 | Yen | 222/215 |
| 2009/0297769 A1* | 12/2009 | Yan et al. | 428/137 |
| 2009/0308880 A1* | 12/2009 | Sims et al. | 220/649 |
| 2010/0084428 A1* | 4/2010 | Bakhos | 222/107 |
| 2010/0133292 A1* | 6/2010 | Ware et al. | 222/1 |
| 2010/0147015 A1* | 6/2010 | Vanderberg et al. | 62/457.7 |
| 2010/0158752 A1 | 6/2010 | Friderich et al. | |
| 2011/0042390 A1 | 2/2011 | Vanderberg et al. | |
| 2011/0187028 A1 | 8/2011 | Menning et al. | |
| 2011/0226763 A1 | 9/2011 | Valencia | |
| 2011/0272419 A1* | 11/2011 | Vanderberg et al. | 220/666 |

FOREIGN PATENT DOCUMENTS

| | | |
|---|---|---|
| EP | 1097899 | 5/2001 |
| EP | 2148771 B1 | 2/2010 |
| EP | 2388233 | 11/2011 |
| FR | 2902083 A1 | 12/2007 |
| GB | 2176463 A | 12/1986 |
| GB | 2322118 | 8/1998 |
| GB | 2367054 | 3/2002 |
| JP | H2133471 | 11/1990 |
| JP | H06135471 | 5/1994 |
| JP | H06-312734 A | 11/1994 |
| JP | H07-0033132 A | 2/1995 |
| JP | 7067792 | 3/1995 |
| JP | 10316140 | 12/1998 |
| JP | 2000142655 | 5/2000 |
| JP | 2002160719 | 6/2002 |
| JP | 2002337835 | 11/2002 |
| WO | 03070620 | 8/2003 |
| WO | 2005100203 | 10/2005 |
| WO | 2007146892 | 12/2007 |
| WO | 2008095024 | 8/2008 |
| WO | 2011006212 | 1/2011 |
| WO | 2012051093 | 4/2012 |
| WO | 2012118527 | 9/2012 |

OTHER PUBLICATIONS

U.S. Appl. No. 60/813,083, filed Jun. 13, 2006, Ware et al., Provisional application.
U.S. Appl. No. 60/829,623, filed Oct. 16, 2006, Ware et al., Provisional application.
U.S. Appl. No. 60/887,194, filed Jan. 30, 2007, Ware et al., Provisional application.
U.S. Appl. No. 61/615,709, filed Mar. 26, 2012, Tom et al., Provisional application.
"Kodama Moves to Ease Disposal, Recycling of Containers for Liquids", Innovative New Packaging in Japan, Jan. 25, 2001.
"Burple". Retroland, Inc., 2003-2011. Retrieved from Internet Nov. 27, 2012 URL: <http://www.retroland.com/burple/> (3 pp.).
"Bottle Design to Fold Small for Disposal", Innovative New Packaging in Japan, Jul. 25, 2000.
Kodama Products Website and Brochure, accessed on the Internet Sep. 19, 2012. <URL: http://www.d-kjk.co.jp/en/product/another.html> (5 pages).
International Search Report and Written Opinion for related PCT Application PCT/US2012/051843, mailed Feb. 8, 2013 (9 pp.).
"Cube® Process", Hedwin Corporation Website, Copyright 2013. Retrieved from the Internet Mar. 12, 2013 <http://www.hedwin.com/services/plastics-manufacturer-capabilities/cuber-process-top-menu>. (1 pp.).
International Seach Report and Written Opinion for related PCT Application PCT/US2013/071583, mailed Mar. 4, 2014 (11 pages).

* cited by examiner

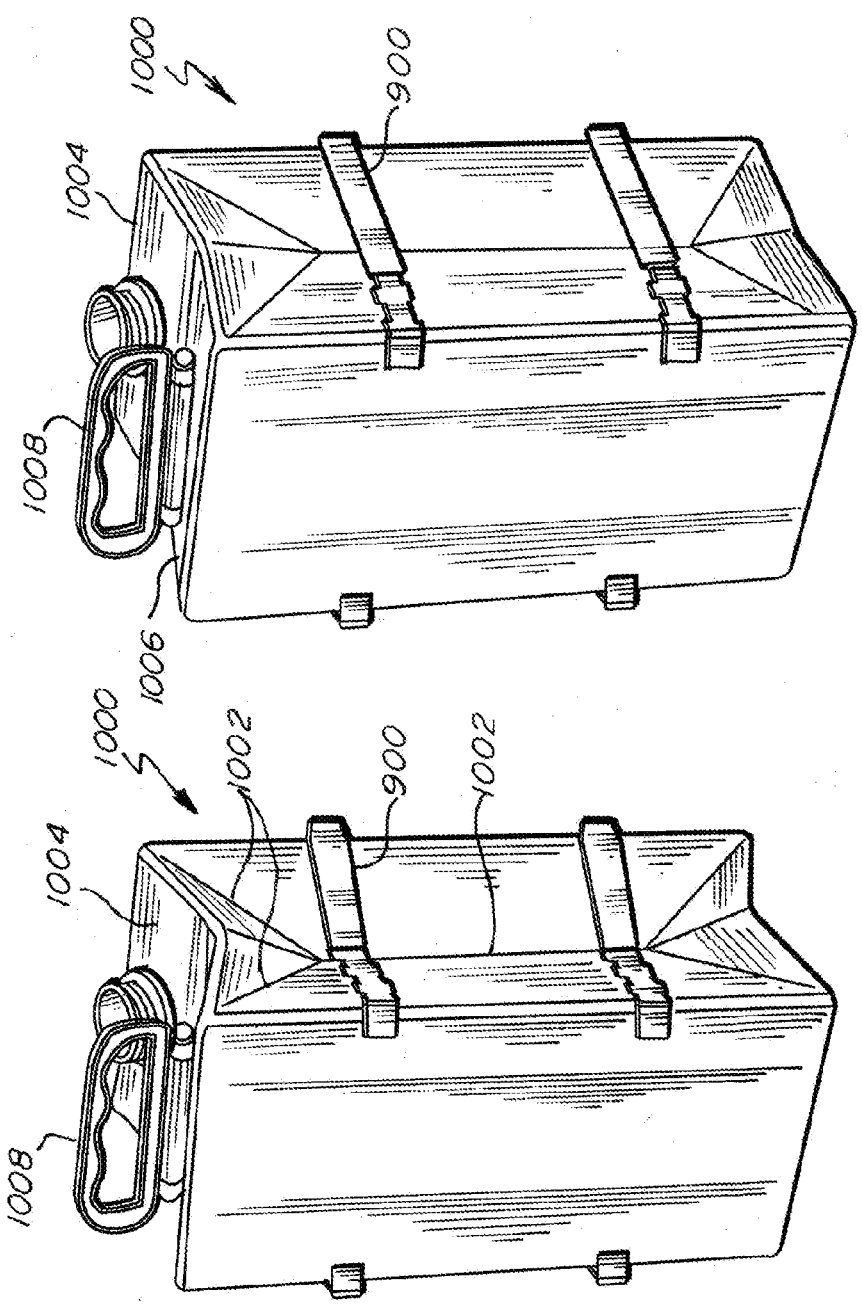

SUBSTANTIALLY RIGID COLLAPSIBLE CONTAINER WITH FOLD PATTERN

FIELD OF THE INVENTION

The present disclosure relates to storage and dispensing systems. More particularly, the present disclosure relates to substantially rigid collapsible containers that may have a generally trapezoidal prism shape and may include fold lines or fold patterns defining a collapse pattern and methods for manufacturing the same.

BACKGROUND OF THE INVENTION

A wide variety of materials must be stored and transported from one location to another. For example, materials in the food industry, such as condiments, must be shipped from the manufacturer to the end user, which may be a restaurant, for example. Similarly, many materials in the medical industry must be stored and shipped, such as pharmaceuticals, fluids, and biologics, for example. Further, acids, solvents, bases, photoresists, slurries, detergents and cleaning formulations, dopants, inorganic, organic, metalorganics, TEOS, and biological solutions, DNA and RNA solvents and reagents, pharmaceuticals, hazardous waste, radioactive chemicals, and nanomaterials, including for example, fullerenes, inorganic nanoparticles, sol-gels, and other ceramics may also be filled, at one location and transported to another location for use.

Traditional storage/shipping containers may include two general types: 1. flexible liners that may be used with an overpack; and 2. rigid containers. Flexible liners may generally be comprised of a relatively thin-walled plastic material, such that the liner may be generally flexible, and are not free-standing. Accordingly, for many uses, a flexible liner may require an outer container or overpack. The overpack in such systems may be a rigid container. In these systems, the liner may often be configured for a one-time use, while the overpack may be configured for a one-time use or multiple uses. The overpack may be comprised of: metal; a relatively hard and thick plastic; glass; wood; a thick and durable fiber-based product, such as cardboard; or some combination thereof. Because the flexible liner of such systems is not typically free-standing, the overpack and liner are often shipped together. Rigid containers, on the other hand, may be used without a flexible liner, in some cases. For example, glass bottles or metal or plastic drums or cans may be used without a liner for some applications. Whether a flexible liner is used with an overpack, or a rigid container is used without a liner, for many applications, materials may be filled at one location and transported in a rigid container to another location for use.

This process may typically include two or three distinct shipping steps, each of which may be associated with a shipping cost that may in turn increase the cost of the material being shipped for the end-user, and/or any other intermediaries. Thus, ideally the costs associated with shipping should be minimized as much as possible. Factors that may generally contribute to the cost of shipping may include the volume and/or weight of the items being shipped. Therefore, the cost of shipping may be lessened if an improved method of shipping were to include either shipping the same amount of material in less space and/or shipping the same amount of material in packaging that weighs less than traditional packaging, for one or more of the shipping steps. Generally the three shipping steps may include: 1. shipping empty containers from the container manufacturer to the chemical or other material supplier for filling; 2. after the supplier has filled the containers with the desired contents, shipping the full (or partially full, as desired) containers to an end-user for dispense; and 3. after the end-user dispenses the material in the container, in some cases, shipping the empty container to another facility for disposal, recycling, and/or sterilization and reuse.

Traditional rigid containers, including overpacks for flexible liners, can be disadvantageous because such containers/overpacks commonly have only a single static expanded state, in that regardless of whether the container is empty or full, the container has the same shape and therefore takes up the same amount of space. Thus, when empty containers are shipped from the container manufacturer to a supplier to be filled, the containers disadvantageously occupy the same shipping volume as they do when they are full. Further, traditional rigid containers/overpacks are often generally cylindrically shaped; for example, bottles, cans, and drums may all be generally cylindrically shaped. Consequently, even when a plurality of rigid cylindrically-shaped objects are densely packed such that they are immediately adjacent one another, their cylindrical shape results in areas of empty, wasted space between the cylinders. Such inability of many traditional rigid containers/overpacks to either collapse into a relatively smaller size when empty, and/or to efficiently densely pack together to efficiently use shipping space can increase the cost of shipping and ultimately the cost of the material being shipped.

Accordingly, there is a need for a container that is more cost-effective to transport than traditional containers. More particularly, there is a need for a container that is more cost-effective to transport when it is both empty and filled.

BRIEF SUMMARY OF THE INVENTION

The present disclosure relates to blow-molded, rigid collapsible containers that can be suitable for storage and dispensing systems of practically any size. The rigid collapsible container may be a stand-alone container, e.g., used without an outer container, and may be dispensed from a fixed pressure dispensing can, in some embodiments. The container may be blow-molded as a unitary piece that may include folds or pre-folds that allows the container to collapse into a relatively flat position. Seams and/or welds in the rigid collapsible container may be substantially eliminated, thereby substantially reducing or eliminating the problems associated with pinholes, weld tears, and overflow.

The present disclosure, according to one embodiment, relates to a blow molded container having a plurality of predetermined fold lines in the container walls, allowing the container walls to flex along the fold lines to an at least partially collapsed state and unfold along the fold lines to a shape of predetermined volume. The container walls may be manufactured using at least one of polyethylene terephthalate (PET), polyethylene naphthalate (PEN), poly(butylene 2,6-naphthalate) (PBN), polyethylene (PE), linear low-density polyethylene (LLDPE), low-density polyethylene (LDPE), medium-density polyethylene (MDPE), high-density polyethylene (HDPE), and polypropylene (PP). In some embodiments, two opposing side walls of the container may include predetermined fold lines that upon collapse of the container, cause the opposing side walls to gusset inward. A top wall of the container may, in an unfolded state, have at least a portion that is configured in an incline slope relative the bottom wall of the container. A fitment port may be positioned on the inclined slope of the top wall. In still further embodiments, a locking mechanism may be provided for locking, at least temporarily, the container walls in the unfolded state. In one embodiment, the locking mechanism may have a base portion, comprising a living hinge, and a slide portion operably attached thereto, the slide portion slidable along the base portion from an unlocked position, permitting the base portion to flex at the living hinge, to a locked position which substantially prevents the base portion from flexing at the living hinge. In another embodiment, the locking mechanism may include one or more tabs on the container and a substantially rigid brace insertable into the tabs such that the brace supports the container in its unfolded state and substantially prevents the container from collapsing significantly. In still another embodiment, the locking mechanism may include a disk of predetermined bending moment located along at least one pre-fold to substantially prevent the at least one pre-fold from flexing significantly at the location of the disk, unless a significant force is applied to overcome the bending moment of the disk. In a further embodiment yet, the locking mechanism may include a rotating disk located along at least one pre-fold, the disk having at least one substantially rigid area and at least one weakened area, wherein when the rotating disk is rotated such that the at least one substantially rigid area is aligned with the at least one pre-fold, the disk substantially prevents the at least one pre-fold from flexing significantly at the location of the disk.

The present disclosure, according to another embodiment, relates to a blow molded container having a plurality of panel walls abutting one another along predetermined fold lines, the plurality of panel walls substantially forming a container of nearly cylindrical shape with nearly domed ends. The plurality of predetermined fold lines may permit the container walls to flex along the fold lines to an at least partially collapsed state and unfold along the fold lines into the nearly cylindrical shape with nearly domed ends. In some embodiments, the predetermined fold lines may run generally vertically along the container, and in still further embodiments, the predetermined fold lines alternate between flexing convexly and concavely with respect to the central axis of the container, thereby permitting the container to collapse axially. A fitment port may be provided at the top of the container and aligned with a central axis of the container. In additional embodiments, a locking mechanism may be provided for locking, at least temporarily, the container in the unfolded state. In some embodiments, the locking mechanism may include a substantially rigid base cup removably attachable to the panel walls, the rigidity of the base cup substantially preventing the panel walls from significantly collapsing along the predetermined fold lines.

The present disclosure, according to yet another embodiment, relates to a method of manufacturing a container having a plurality of predetermined fold lines in one or more container walls of the container, allowing the container walls to flex along the fold lines to an at least partially collapsed state. The method may include blow molding the container in an at least partially collapsed state so as to define the predetermined fold lines. In some embodiments, the container includes four side walls, a bottom wall, and a top wall, wherein in an unfolded state, the top wall has at least a portion that is configured in an incline slope relative the bottom wall of the container. In other embodiments, the container is nearly cylindrical in shape with nearly domed ends. The container walls may be manufactured using at least one of polyethylene terephthalate (PET), polyethylene naphthalate (PEN), poly(butylene 2,6-naphthalate) (PBN), polyethylene (PE), linear low-density polyethylene (LLDPE), low-density polyethylene (LDPE), medium-density polyethylene (MDPE), high-density polyethylene (HDPE), and polypropylene (PP).

The present disclosure, according to a further embodiment, relates to a method of delivering a material to an end user process. The method may include providing a blow molded container having a plurality of predetermined fold lines in one or more container walls, allowing the container walls to flex along the fold lines to an at least partially collapsed state and unfold along the fold lines to a shape of predetermined volume, the container having the material stored in an interior thereof. The method may further include coupling a connector to a port of the container, the connector operably coupling the container to the end user process, and dispensing the material from the container via the connector and delivering the material to the end user process. The material may be dispensed via pump dispense, direct or indirect pressure-assisted pump dispense, or direct or indirect pressure dispense.

In some embodiments, the container may have a substantially rigid wall forming a generally trapezoidal prism shaped interior cavity of the container. The container may also have a plurality of predetermined fold lines, allowing the container to be shipped and stored in a collapsed state, expanded into a shape of predetermined volume, and maintain the expanded shape upon dispense of the contents therein.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 10A illustrates a container with the locking mechanism of FIG. 9A attached thereto and in an unlocked position.

FIG. 10B illustrates a container with the locking mechanism of FIG. 9A attached thereto and in a locked position.

DETAILED DESCRIPTION

The present disclosure relates to novel and advantageous containers for storage and dispense. More particularly, the present disclosure relates to novel and advantageous substantially rigid collapsible containers and flexible containers that may include fold lines or fold patterns defining a collapse pattern. More particularly, the present disclosure relates to a blow-molded, substantially rigid collapsible container with fold lines that may be suitable for storage and dispensing systems of virtually any size from about 1 Liter or less to about 200 Liters or more. The substantially rigid collapsible container may be a stand-alone container, e.g., used without an outer container, and may be dispensed by any suitable means, including by using a pump or a pressurized fluid, or a combination thereof. Unlike certain prior art liners that are formed by welding films together with resultant seams, seams in the substantially rigid collapsible container may be substantially eliminated, thereby substantially reducing or eliminating the problems associated with pinholes, weld tears, gas saturation, and overflow, in some embodiments.

Example uses of the containers disclosed herein may include, but are not limited to, transporting and dispensing acids, solvents, bases, photoresists, such as but not limited to i-Line photoresist, slurries, detergents and cleaning formulations, dopants, inorganics, organics, metalorganics, TEOS, and biological solutions, DNA and RNA solvents and reagents, pharmaceuticals, hazardous waste, radioactive chemicals, and nanomaterials, including for example, fullerenes, inorganic nanoparticles, sol-gels, and other ceramics. However, such containers may further be used in other industries and for transporting and dispensing other products such as, but not limited to, biologics and other materials used in the life sciences, coatings, paints, polyurethanes, food, soft drinks, cooking oils, agrochemicals, industrial chemicals, cosmetic chemicals, petroleum and lubricants, adhesives, sealants, health and oral hygiene products, and toiletry products, etc. Those skilled in the art will recognize the benefits of such containers and the process of manufacturing the containers, and therefore will recognize the suitability of the containers to various industries and for the transportation and dispense of various products.

As used herein, the terms "rigid" or "substantially rigid," in addition to any standard dictionary definitions, are meant to also include the characteristic of an object or material to substantially hold its shape and/or volume when in an environment of a first pressure, but wherein the shape and/or volume may be altered in an environment of increased or decreased pressure. The amount of increased or decreased pressure needed to alter the shape and/or volume of the object or material may depend on the application desired for the material or object and may vary from application to application.

Figure 1:
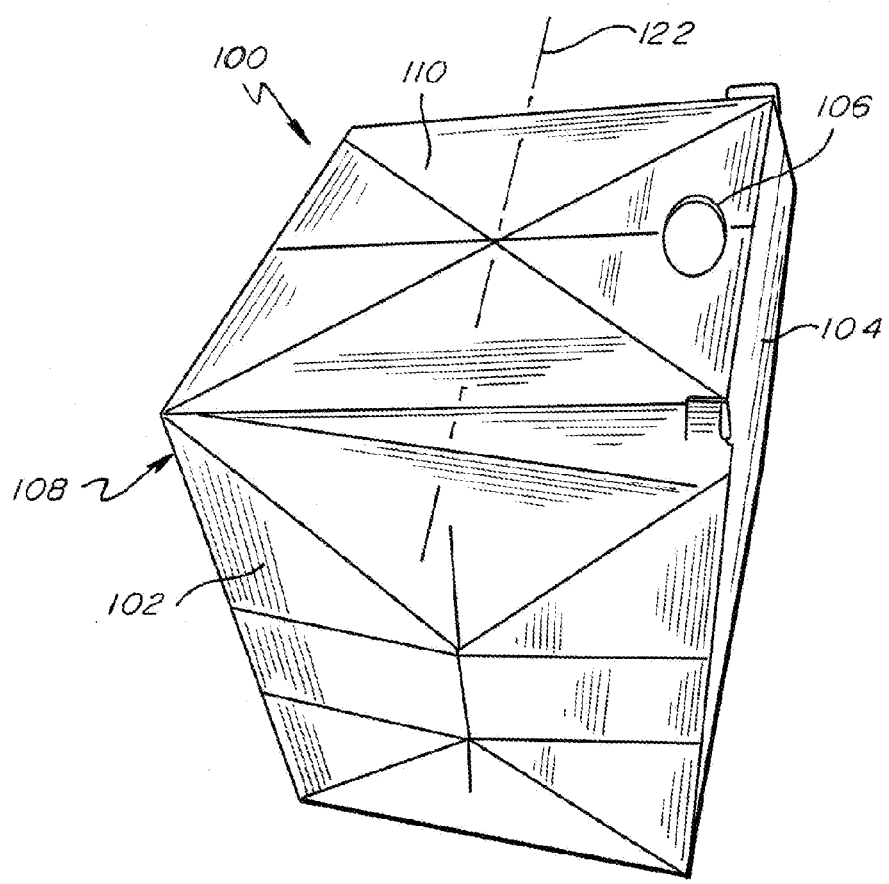
FIG. 1 is a perspective view of container, in accordance with embodiments of the present disclosure.

FIG. 1 illustrates one embodiment of a substantially rigid collapsible container 100 of the present disclosure. Container 100 may include a substantially rigid container wall 102 and a port 106. As may be seen in FIG. 1, in some embodiments the container 100 may be generally shaped as a trapezoidal prism, having two generally parallel sides 104, 108 with different heights, resulting in a sloping top surface 110. The port 106 may be on the top surface 110 of the container. The port 106 may include a fitment that may be adapted for use with a connector for dispense, for example, and/or for use with a cap used during shipping and storage. In some embodiments, the port 106 may be positioned nearest the taller end of the sloping top surface 110, as shown in FIG. 1. The sloping top surface 110 may advantageously cause any headspace gas, e.g., micro bubbles created in the contents of the container due to shipping movement, to collect in the interior of the container at the raised end 104. In embodiments where the port 106 is disposed at the raised end 104, micro bubbles that may have formed may therefore be easily removed prior to dispense, thereby reducing or eliminating any headspace gas within the container 100. While embodiments of the present disclosure may be described with regard to a container shaped as a trapezoidal prism, as will be illustrated further below, other container shapes are possible and are within the spirit and scope of the present disclosure. For example, a generally rectangular prism, or any other suitable container geometry that may have a generally rectangular or square cross-section may also be used according to some embodiments of the present disclosure.

Container wall 102 may generally be thicker than the containers in conventional flexible liner-based systems. The increased thickness of container wall 102 and/or the composition of the film comprising the container 100 may increase the rigidity and strength of container. In one embodiment, container wall 102 may be from about 0.05 mm to about 3 mm thick, desirably from about 1.2 mm to about 2 mm thick. However, the thickness may vary depending on the volume of the container. Generally, container 100 can be thick and rigid enough to substantially reduce or eliminate the occurrence of pinholes. The thickness may be selected so that, when a specified amount of pressure or vacuum is applied to container 100, container wall 102 is collapsible to dispense liquid from within the interior cavity. In one embodiment, the dispensability of container 100 may be controlled based on the thickness selected for container wall 102. That is, the thicker container wall 102 is, the more pressure that will need to be applied to fully dispense the liquid from within interior cavity 104.

As mentioned above, both the thickness of the container wall 102 and the composition of the film comprising the container can provide rigidity to container 100. In some embodiments, container 100 may be manufactured using one or more polymers, including plastics, nylons, EVOH, polyolefins, or other natural or synthetic polymers. In further embodiments, container 100 may be manufactured using polyethylene terephthalate (PET), polyethylene naphthalate (PEN), poly(butylene 2,6-naphthalate) (PBN), polyethylene (PE), linear low-density polyethylene (LLDPE), low-density polyethylene (LDPE), medium-density polyethylene (MDPE), high-density polyethylene (HDPE), and/or polypropylene (PP). In some embodiments, the material or materials selected and the thickness of that material or those materials may determine the rigidity of the container 100.

Examples of the types of materials that may comprise a container are disclosed in detail in International PCT Appln. No. PCT/US11/55558, titled "Substantially Rigid Collapsible Liner, Container and/or Liner for Replacing Glass Bottles, and Flexible Gusseted or Non-Gusseted Liners," filed Oct. 10, 2011, which is hereby incorporated by reference herein in its entirety.

As previously discussed, for many applications, a container or a liner-based storage system is used to ship materials back and forth. A typical storage/shipping container involves the use of a rigid container or overpack that may or may not have a more flexible liner inside of the rigid container. The standard shipping cycle for a container may involve several different transportation steps. For example, an initial transportation step may include one or more empty containers being shipped from the container manufacturer to a chemical or other material supplier for filling with the desired contents. After the supplier receives and fills the one or more containers, the supplier may ship the filled container(s) to an end-user in a second transportation step. Once the end-user dispenses the contents of the container, in some cases, a third transportation step may require the end-user to ship the used and empty container(s) back to the supplier or to another location for disposal, sterilization, or recycling, for example. Accordingly, a standard transportation cycle may include shipping a container in an empty state (at least once) and shipping the container in a filled state. As explained above, each shipping cycle has cost associated therewith, and these shipping costs typically increase the cost of the material being shipped. Factors that may affect shipping cost may include the volume and/or weight of the shipment. To the extent that containers of similar volume can be configured to take up less shipping space and/or weigh less than traditional containers, shipping costs may be lessened, and in some cases, substantially lessened.

Figure 2:
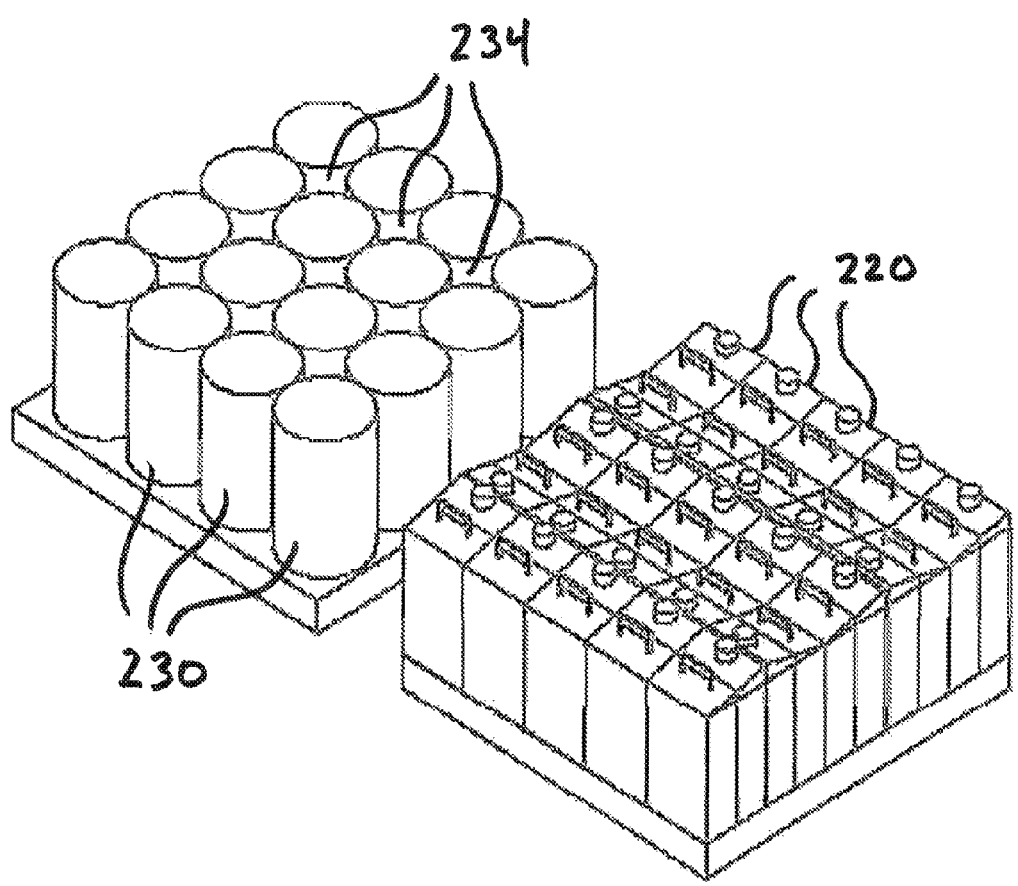
FIG. 2 shows the difference between how many traditional rigid wall containers can be shipped in a given space compared to how many filled liners of the present disclosure of similar volume can be shipped in the same space, in accordance with embodiments of the present disclosure.

Typical rigid containers and/or overpacks do not capitalize on these shipping efficiencies in one or more ways. For example, traditional containers are often generally cylindrically shaped. Due to their cylindrical shape, multiple such containers densely arranged as tightly or as closely as possible, on a pallet for example, will not effectively use all of the given space on the pallet. As may be seen specifically in FIG. 2, for example, even when a plurality of rigid cylindrically-shaped containers 230 are densely packed such that they are immediately adjacent one another, their cylindrical shape results in areas of empty, wasted space between the containers 234, as will be understood by those skilled in the art. In contrast, a plurality of trapezoidal prism shaped containers or containers of the same or substantially the same interior volume having a generally rectangular or square shaped cross-section 220, as described in the present disclosure, densely arranged, on a pallet for example, may significantly reduce or eliminate the amount of wasted space between containers. Particularly, as may be seen in FIG. 2, trapezoidal prism shaped containers or containers having a generally rectangular or square shaped cross-section 220 may generally be densely packed next to each other in a way that leaves no or substantially no dead space between adjacent containers. Consequently, several more containers 220 in the shape of a trapezoidal prism or generally having a rectangular or square shaped cross-section may occupy the same or less space as cylindrically-shaped containers 230 of similar volume, because the wasted space 234 between cylindrically shaped containers can be substantially eliminated. For example, as shown in FIG. 2, about 25 trapezoidal prism shaped containers 220 may fit in generally the same shipping space as about 16 cylindrically-shaped containers 230 of similar volume.

As noted above, a portion of the cost of transporting containers may be related to volume. In some cases, that portion of the transportation cost may be significant. To this end, the ability to ship more containers in the same amount of shipping space can represent a significant improvement in shipping cost, including but not limited to an improvement in shipping cost of up to approximately 37% for the transportation of filled containers of the present disclosure over traditional rigid containers.

However, a simple generally rectangular prism shaped can or container fails to fully capitalize on the above-noted shipping efficiencies, in that such containers may only help reduce shipping costs when the containers are filled. As noted above, however, a further manner in which traditional rigid containers and/or overpacks have failed to fully capitalize on the above-noted shipping efficiencies is that such traditional containers and/or overpacks commonly have only a single static expanded state, in that regardless of whether the container is empty or full, the container has the same shape and therefore takes up the same amount of space. Because traditional rigid containers may have only one static rigid shape, shipping space is not used efficiently when empty containers are being shipped, for example from the container manufacturer to the chemical or other material supplier prior to being filled, and/or from the end-user to a disposal/recycle/reuse location after the contents have been dispensed. Essentially, with traditional rigid containers, including any generally rectangular prism shaped containers, the payer of the transportation costs is paying to ship air (i.e., the unfilled space within the empty container). Because shipping volume is not efficiently considered, the overall cost for shipping the material in a traditional rigid container may be unnecessarily high.

In addition, in pressure dispense applications, simple generally rectangular prism shaped containers tend to twist when they are collapsed under pressure. Therefore, when the material in such a container is dispensed under pressure, it may require much more energy (i.e., pressure) to dispense the contents of the container, and the dispensability rate may be significantly reduced compared to that of traditional cylindrically shaped containers or flexible liners.

Accordingly, embodiments of the present disclosure may advantageously make more efficient use of shipping space by including the ability to collapse in a predetermined manner when in an empty state and expand to a substantially rigid free-standing state when ready to be filled. Such collapsing capability permits more, and in some cases significantly more, empty containers to be shipped in the same amount of space than traditional non-collapsible rigid containers or overpacks. To the extent that more empty containers may be shipped in the same or less space as traditional containers, shipping cost, which may in part be dependent on volume, may be decreased, and in some cases, significantly decreased. Containers of the present disclosure may be configured to collapse, in some embodiments, by including folding patterns that may include one or more "hard folds" and/or one or more "pre-folds" or "secondary folds" in the rigid collapsible container.

Figure 3:
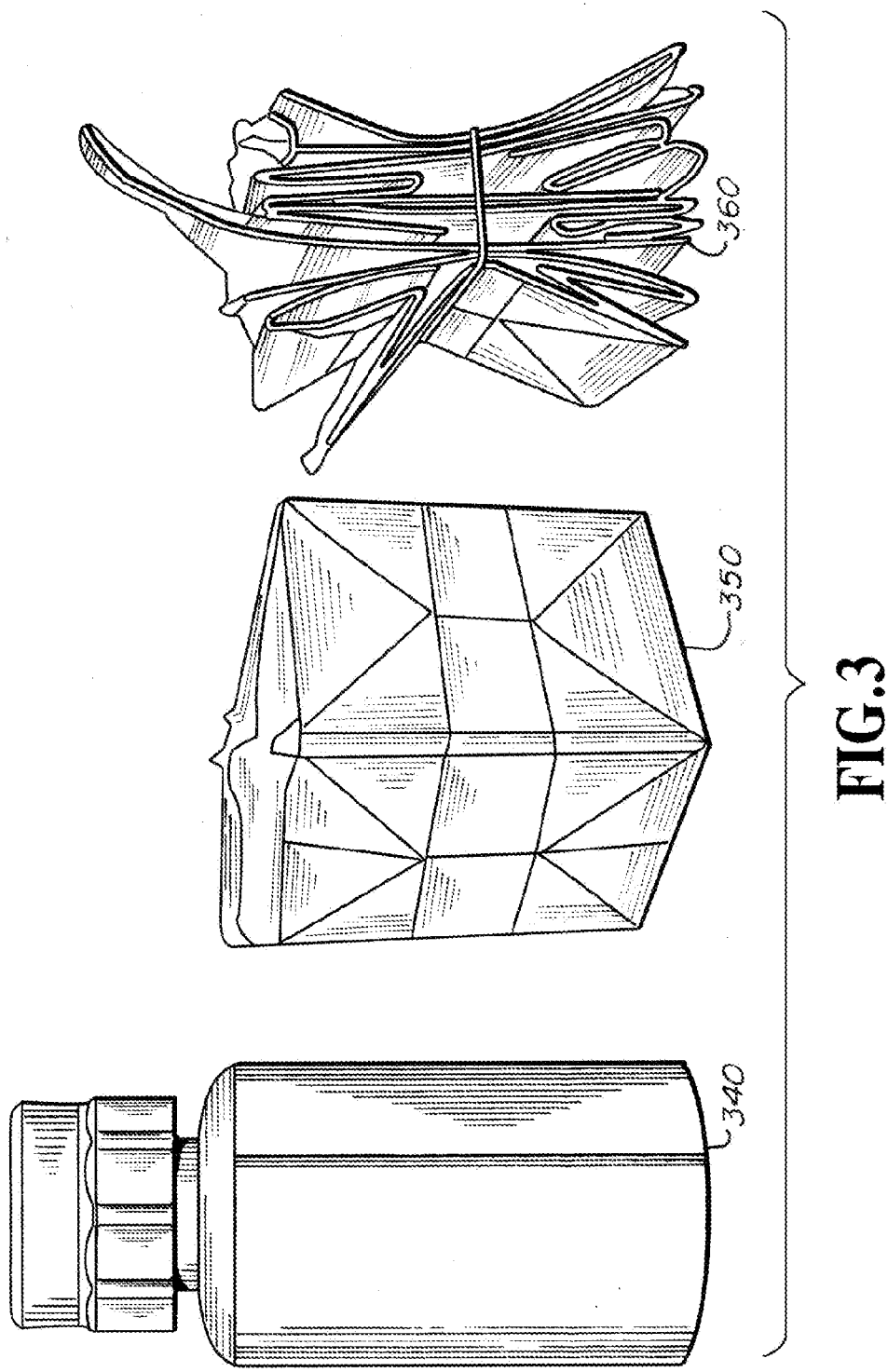
FIG. 3 illustrates the difference between the amount of space taken up by a traditional rigid wall container, an embodiment of a filled liner of the present disclosure of similar volume, and multiple collapsed liners of the present disclosure.

Embodiments of the present disclosure that include fold lines or fold patterns, in contrast to traditional containers/overpacks, may collapse into a generally flat shape that aids in dispensability as well as allows for more empty collapsed containers to be shipped than traditional non-collapsible containers in the same amount of space. Particularly, FIG. 3 shows one example of the substantial space-saving advantages (and consequently cost-saving advantages) of some embodiments of the present disclosure. One typical cylindrically shaped rigid container 340 may generally consume the same amount of floor space as one container of similar volume of the present disclosure in the expanded state 350 (even though, as discussed above, an expanded container 350 as disclosed herein nonetheless results in more efficient use of shipping volume). However, when the container of the present disclosure is in a collapsed state, the volume of space taken up by the container can be significantly reduced. As may be further seen in FIG. 3, for example, a plurality of collapsed containers 360, in some embodiments, may generally consume the same or less amount of space as a single traditional container or overpack 340 because traditional rigid containers or overpacks are not collapsible in a similar predetermined manner. In some embodiments, potentially significantly more empty, collapsed containers 360 may be able to occupy the same shipping space as a single rigid cylindrically shaped container 340, depending on, for example but not limited to, the material of the container and the thickness of the material, the folding pattern of the container, and/or how flat the empty containers 360 are configured to be when they are collapsed. Such collapsing capability may often result in substantial cost-savings by permitting more empty containers to be shipped in the same amount of space as compared to traditional rigid containers 340.

Figure 4:
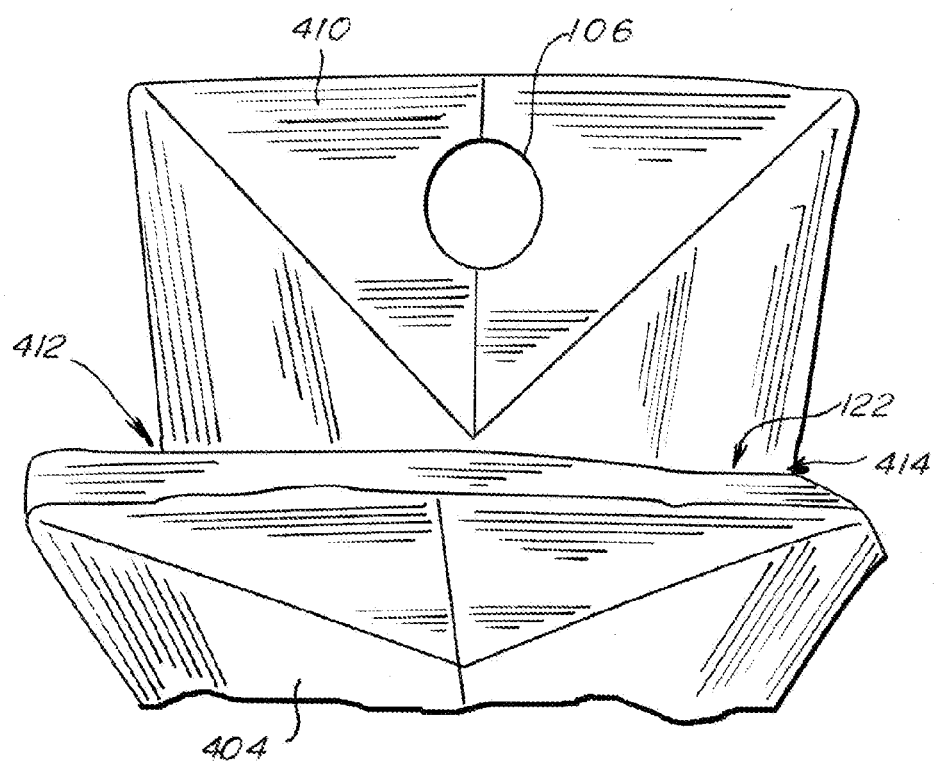
FIG. 4 shows a liner of the present disclosure collapsing along a fold line, in accordance with one embodiment of the present disclosure.

As noted above, to achieve a generally flat collapsed state, some embodiments of the present disclosure may include one or more fold lines or fold patterns. The fold lines or patterns or pre-folds may help the container collapse into the desired predetermined shape. As may be seen in FIG. 4, which illustrates a top down perspective view of the top of one embodiment of container of the present disclosure, in some embodiments, the generally trapezoidally shaped prism may collapse along an axis line 122 that bisects the top panel of the container. This may result in two sides 404, 410 of the container coming generally together in a parallel fashion, while the other two sides 412, 414 may gusset inward (or outward). Because the port 106 may be configured from a substantially rigid material that may not be amendable to folding, the axis line for folding may be chosen such that the port 106 does not lie on the axis line, in some embodiments.

Figure 5:
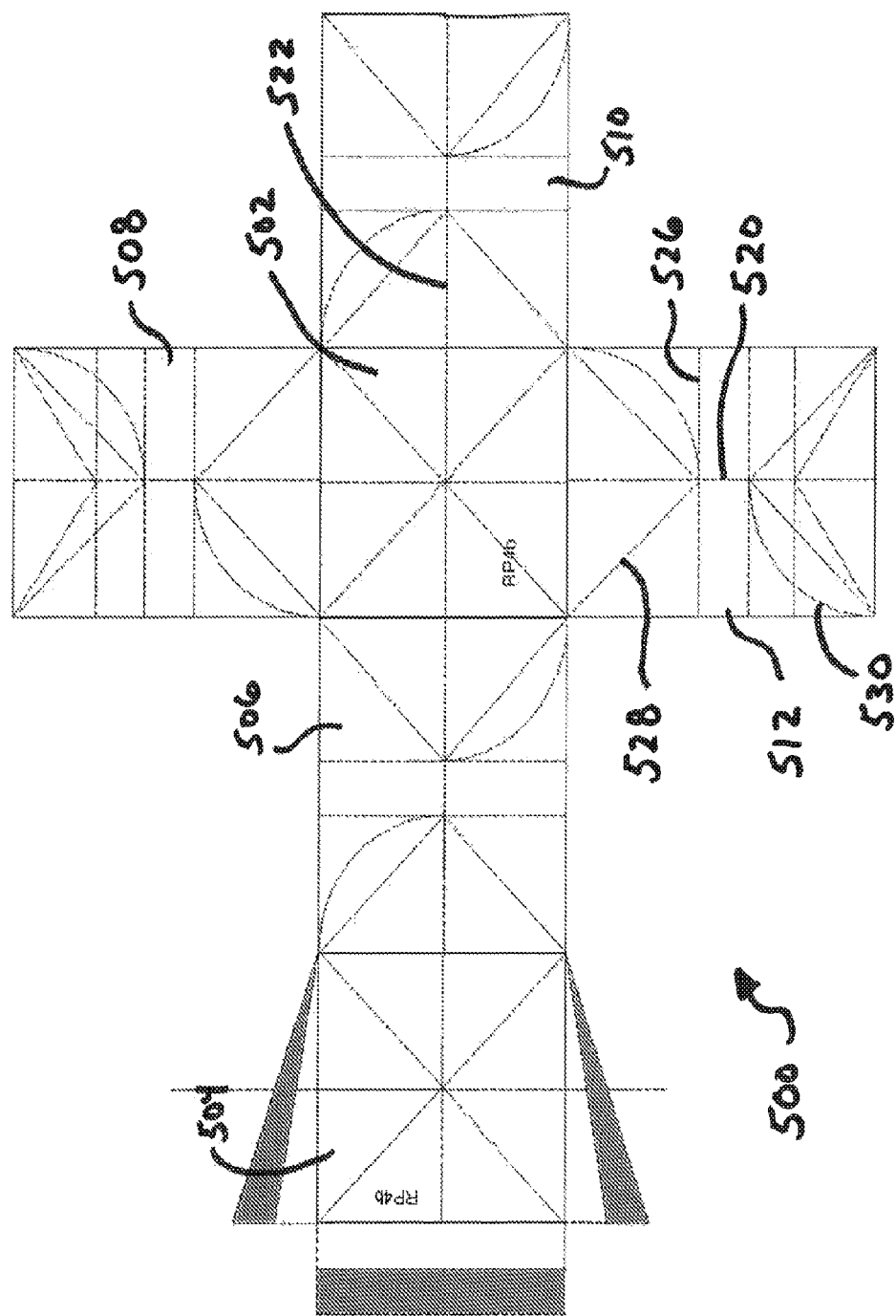
FIG. 5 shows a layout for one embodiment of a pattern for the fold lines of a container of the present disclosure.

FIG. 5 shows a diagram illustrating a pattern for fold lines of a container 500 according to one embodiment. FIG. 5 is for illustration purposes and is not intended to limit the embodiments to those made from a flat sheet that is folded together and welded along the edges, although such embodiments are contemplated as within the scope of the present disclosure, as discussed in further detail below. The diagram shows the bottom panel 502, the top panel 504, and the four side wall panels 506, 508, 510, and 512, and the fold lines or patterns that may be included in some embodiments of the container 500. The fold lines or patterns are generally represented by the dashed lines in the diagram. While not limited to the specific pattern shown, some of the pre-folds that may be included for assisting in the collapse or folding of the various embodiments of containers described herein may include fold 520, which generally vertically bisects the container along axis 122, one or more folds 526, which are perpendicular to fold 520 and may help give flexibility to the gusseted sides of the container, and diagonal and/or arced folds 528, 530, which can help give flexibility to the top and bottom ends of the gusseted sides and may permit the container to be more easily collapsed along axis 122. Of course, more pre-folds than those discussed or shown in FIG. 5 may be included, and likewise, not all of the pre-folds discussed or shown in FIG. 5 need be included in every embodiment. While the specific pattern of fold lines of FIG. 5 is shown, it will be understood that other patterns of fold lines are possible and are within the scope of the present disclosure, particularly patterns that may help the container collapse into a generally flat shape, and even more particularly, patterns that may help the container collapse into a generally flat shape taking into consideration the location of the port 106.

Figure 6:
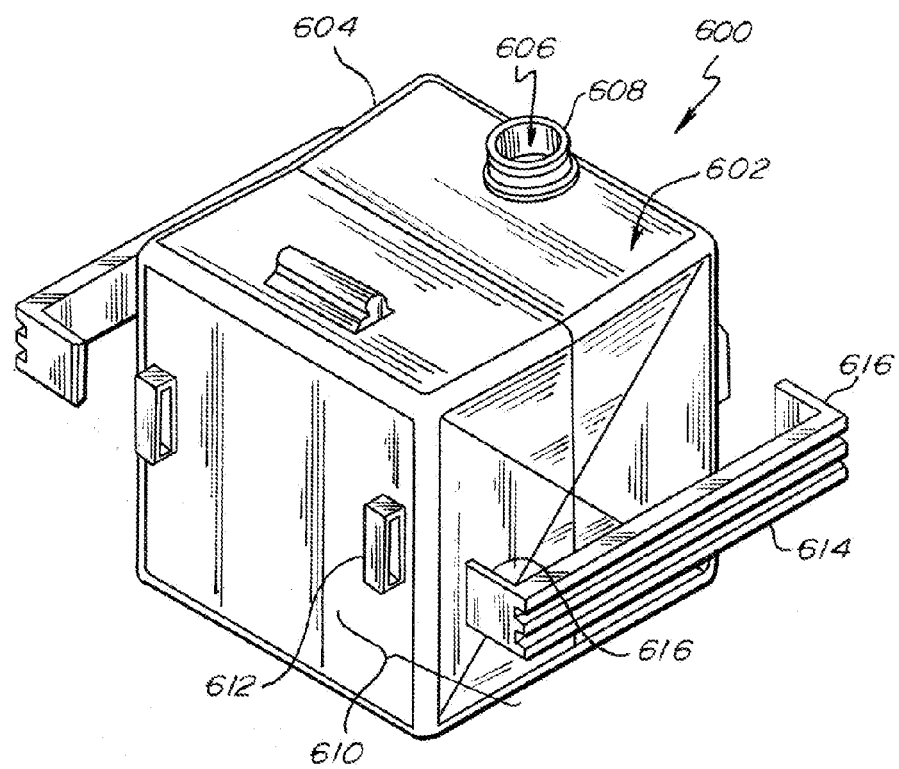
FIG. 6 is a perspective view of container, in accordance with another embodiment of the present disclosure.

FIG. 6 illustrates another embodiment of a container 600 of the present disclosure. As may be appreciated from FIG. 6, container 600 may be generally similar to that of container 100, but the top panel 602 of the container may be divided into two or more sections. In FIG. 6, the top panel 602 of container 600 has been bisected into two sections; however, it is recognized that the top panel could be divided equally or unequally into two or more sections. One or more sections of the top panel 602, such as section 604 in FIG. 6, may be sloped, as discussed with respect to top panel 110 above. A port 606 may be located on the sloping top surface 604 of the container, or at any other suitable location. Again, the port 606 may include a fitment 608 that may be adapted for use with a connector for dispense, for example, and/or for use with a cap used during shipping and storage. In some embodiments, the port 606 may be positioned nearest the taller end of the sloping top surface 604, as shown in FIG. 6. Thus, the sloping top surface 604 may advantageously cause any headspace gas to collect in the interior of the container at the raised end.

As with any of the embodiments disclosed herein, the container 600 of FIG. 6 may be manufactured from any of the materials disclosed herein, utilized for dispensing any of the materials disclosed herein, and utilized with any suitable dispensing application, such as pump dispense, direct and indirect pressure-assisted pump dispense, and direct and indirect pressure dispense. In one embodiment, the container 600 or any other container of the present disclosure may be, for example, manufactured from HDPE and designed or configured for pump or pressure dispense of a photoresist, such as i-Line photoresist. The container may additionally take advantage of any of the other features disclosed herein, including any of the locking mechanisms discussed in detail below.

Figure 7:
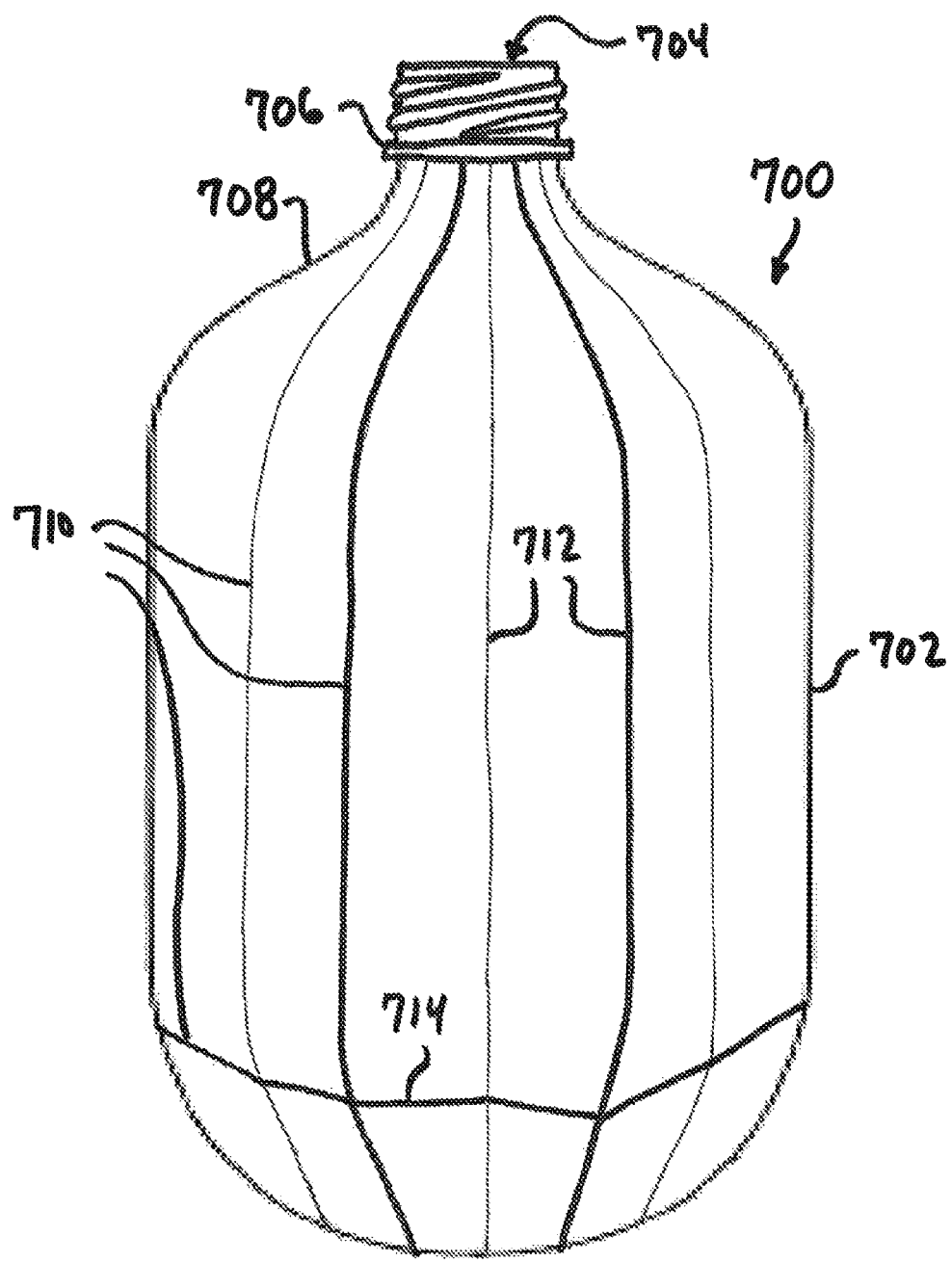
FIG. 7 is a perspective view of container, in accordance with yet another embodiment of the present disclosure, in an unfolded state.

As briefly alluded to above, cylindrically shaped, substantially cylindrically shaped, or nearly cylindrically shaped containers can sometimes be beneficial in that less energy (i.e., pressure) may be required to dispense the contents of the generally cylindrical container due to the shape as compared to that of traditional generally rectangular containers. Additionally, a cylindrically shaped, substantially cylindrically shaped, or nearly cylindrically shaped container may provide a sump area at the bottom of the container, which may be desirable in some cases. Accordingly, in further embodiments, as illustrated in FIG. 7, a container 700 of the present disclosure may be configured in more of a cylindrically shaped, substantially cylindrically shaped, or nearly cylindrically shaped container, or more particularly, in more of a cylindrically shaped, substantially cylindrically shaped, or nearly cylindrically shaped container having domed, substantially domed, or nearly domed ends. As used herein, the term cylindrical or variations thereof are meant to include, although are not limited to, embodiments of a cylinder (or substantially a cylinder or nearly a cylinder) and a cylinder (or substantially a cylinder or nearly a cylinder) with domed (or substantially or nearly domed) ends. Similar to container 100, container 700 may include a substantially rigid container wall 702 and a port 704, which may be located at or near the top and axially-aligned with the axis of the rigid container wall. However, other port locations may be appropriate. The port 704 may include a fitment 706 that may be adapted for use with a connector for dispense, for example, and/or for use with a cap used during shipping and storage. A sloping top surface 708 may advantageously cause any headspace gas, e.g., micro bubbles created in the contents of the container due to shipping movement, to collect in the interior of the container near the axially-aligned port 704. Thus, micro bubbles that may have formed may therefore be easily removed prior to dispense, thereby reducing or eliminating any headspace gas within the container 700.

To help achieve a generally flat collapsed state, the container 700, as with the previously described embodiments, may include one or more fold lines or fold patterns 710. The fold lines, patterns, or pre-folds 710 may help the container collapse into the desired predetermined flattened shape or in a desired predetermined manner. As may be generally seen from FIG. 7, in one embodiment, some of the pre-folds 712 may be configured or oriented such that they run substantially or generally vertically when the container 700 is vertically oriented. In other words, these pre-folds 712 may be oriented such that a significant portion of the pre-folds runs substantially parallel with the axis of the cylindrically shaped, substantially cylindrically shaped, or nearly cylindrically shaped container 700.

The pre-folds 712 may be configured to fold convexly or concavely with respect to the central axis of the container 700. In some embodiments, as illustrated in FIG. 7, for example, the pre-folds 712 may alternate from being configured to fold convexly or concavely with respect to the central axis of the container 700. Accordingly, the cylindrically shaped, substantially cylindrically shaped, or nearly cylindrically shaped container 700 may be generally axially collapsible along the pre-folds 712. Container 700 may include any suitable number of such pre-folds, such as but not limited to, 4 or more pre-folds. As may be appreciated by those skilled in the art, the more of such pre-folds there are, the more likely the expanded container 700 will be closer to a cylindrical shape. However, too many pre-folds could introduce other structural problems, and thus, in some embodiments, the number of pre-folds selected for the container 700 may depend on, but is not limited to, the desired resulting expanded shape of the container, the material of the container and the thickness of the material, the intended use of the container, etc.

Of course, more pre-folds 710 than those discussed or shown in FIG. 7 may be included, and likewise, not all of the pre-folds discussed or shown in FIG. 7 need be included in every embodiment. For example, additional pre-folds 714 that are not substantially vertically oriented may be include, and may assist in the axial collapse of the container 700. Of course, even other pre-folds of other orientations may be included, and only an example of some of such pre-folds has been illustrated in detail herein for the ease of illustration. Similarly, while the specific pattern of fold lines of FIG. 7 is shown, it will be understood that other patterns of fold lines are possible and are within the scope of the present disclosure, particularly patterns that may help the container 700 collapse into a generally flat shape.

Figure 8:
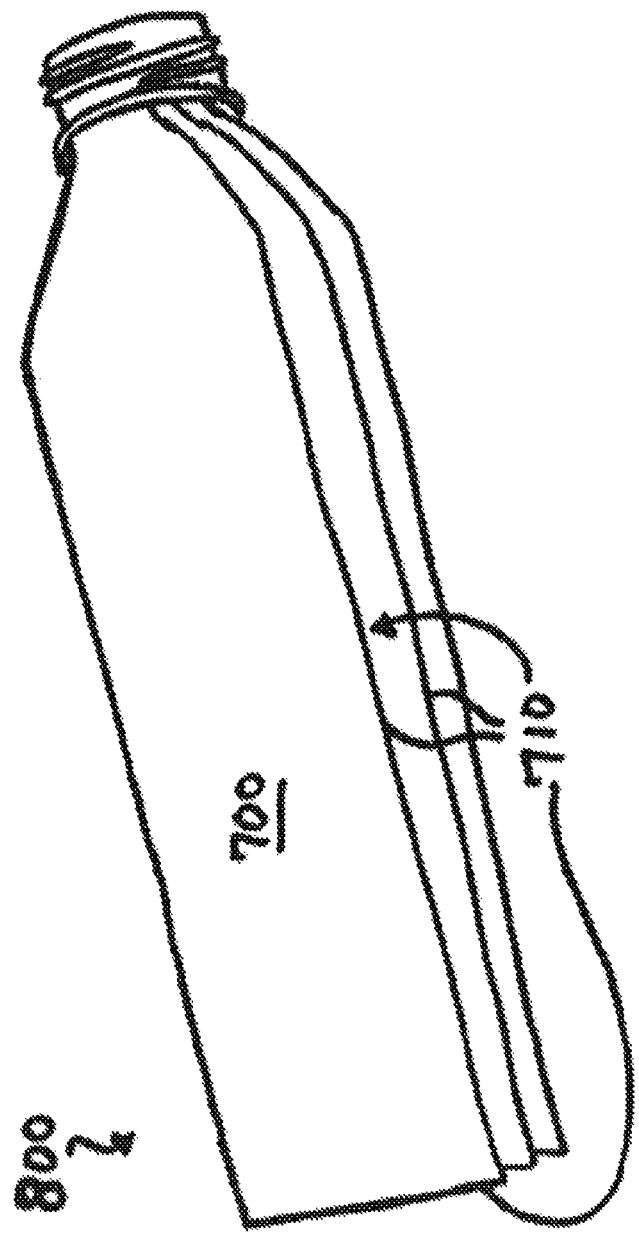
FIG. 8 is a perspective view of container, in accordance with yet another embodiment of the present disclosure, in a folded state.

As illustrated in FIG. 8, a container 700 may be folded along pre-folds 710 to a generally flattened state 800. As discussed above, embodiments of the present disclosure that may collapse into a generally flat shape can aid in dispensability as well as allow for more empty collapsed containers to be shipped than traditional non-collapsible containers in the same amount of space. That is, a plurality of containers 700 in a collapsed or flattened state 800, may generally consume the same or less amount of space as a single traditional container or overpack because traditional rigid containers or overpacks are not collapsible in a similar predetermined manner. In some embodiments, potentially significantly more empty, collapsed containers may be able to occupy the same shipping space as a single rigid container, depending on, for example but not limited to, the material of the container and the thickness of the material, the folding pattern of the container, and/or how flat the empty containers are configured to be when they are collapsed. Such collapsing capability may often result in substantial cost-savings by permitting more empty containers to be shipped in the same amount of space as compared to traditional rigid containers.

The various embodiments of containers of the present disclosure can be manufactured by any suitable means for example by blow molding the container as a unitary component, by for example using extrusion blow molding, injection blow molding, injection stretch blow molding, rota molding, etc. A manufacturing process utilizing injection blow molding or injection stretch blow molding can allow for containers to have more accurate shapes than other manufacturing processes. By blow molding the container, welds and seams in the container and issues associated with welds and seams may be substantially eliminated. For example, welds and seams may complicate the manufacturing process and weaken the container. In addition, certain materials, which are otherwise preferable for use in certain containers, are not amenable to welding.

In order to manufacture certain embodiments of containers having fold lines or fold patterns according to the present disclosure by blow molding, one manufacturing method may include blow molding the container in a mold that is modeled at some intermediate state between a fully expanded or fully collapsed state of the resulting container. Blow molding the container in a mold at this intermediate state may assist in the formation of the fold lines or patterns. After the molding process is completed, the blow molded container may be partially or completely collapsed for transport and expanded along the fold lines or patterns at the fill destination.

In other embodiments, the containers may be manufactured by suitable welding methods, such as by welding together two or more panels into the container shape. The fold lines or patterns may be formed, in some welded embodiments, by welding seams that join the two or more panels. However, it is recognized that any other method of forming a container with fold lines or patterns, or any combination of methods, may be used.

In use, the container may be filled with, or contain, an ultrapure liquid, such as an acid, solvent, base, photoresist, dopant, inorganic, organic, or biological solution, pharmaceutical, or radioactive chemical. It is also recognized that the container may be filled with other products, such as but not limited to, soft drinks, cooking oils, agrochemicals, health and oral hygiene products, and toiletry products, etc. In some embodiments, the containers may be configured to be used a single time and disposed of, while in other embodiments the containers may be configured to be used one or more times. The contents may be sealed under pressure, if desired.

In some embodiments, a seal provided may be a break seal at the port. The break seal may be removed, punctured, or otherwise broken in order to unseal the container and access the contents therein. In additional or other embodiments, seals that may be utilized include those described, for example, in International PCT Appln. No. PCT/US11/55558, previously incorporated, and U.S. Provisional Patent Application No. 61/615,709, entitled, "Closure/Connectors for Liner-Based Shipping and Dispensing Containers," filed Mar. 26, 2012, which is hereby incorporated herein by reference in its entirety.

Once filled, if the container is permitted to unintentionally partially collapse due to some pre-existing force of the pre-folds, liquid may be forced out of the spout when the cap is removed, as will be appreciated by those skilled in the art. In some cases, this may not pose a significant problem; however, in other cases, if contents are forced out in such a manner, it could be harmful to the user and/or result in a costly loss of contents. While in some embodiments, the selected material for the container and the thickness of the material, the shape of the container, the size of the container, the number and configuration of pre-folds, and/or other structural or design choices may be selected, or may be enough on their own, to help keep the container from partially or significantly collapsing after fill. However, in other embodiments, an additional locking mechanism, device, or feature may be included to keep the container from collapsing significantly.

Figure 9A:
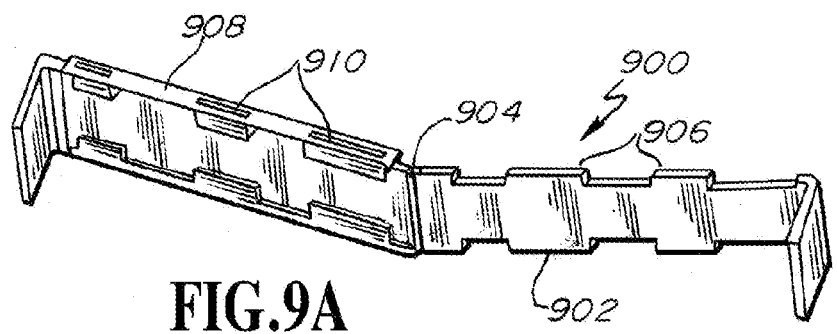
FIG. 9A illustrates a locking mechanism in accordance with one embodiment of the present disclosure in an unlocked position.
Figure 9B:
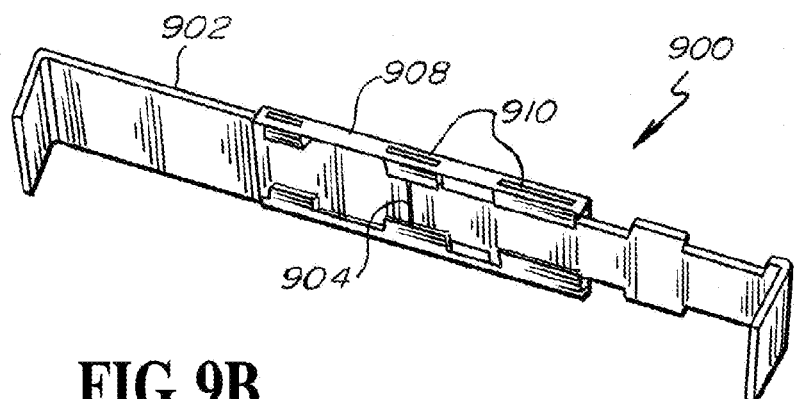
FIG. 9B illustrates the locking mechanism of FIG. 9A in a locked position.

In one embodiment, for example, illustrated in FIGS. 9A and B, a locking mechanism 900 with two parts may be provided. A first part may comprise a base portion 902 that comprises a living hinge allowing it to flex around a flex point or hinge point 904. The base portion 902 may include one or more locks or notches 906 on one end of the hinge. A second portion 908 may be attached, or removably attached to the base portion and slidable therealong. The second portion or slide portion 908 may include one or more depressions or cavities 910 along one or more of its edges that correspond with one or more of the locks or notches 906 of the base portion, if and when desired. The second portion 908 may be operated to slide from an unlocked position, illustrated in FIG. 9A, where the second portion is freely slidable, into a locked position, illustrated in FIG. 9B, where the depressions or cavities 910 of the second portion are aligned and operably coupled with the locks or notches 906 of the base portion 902 to "lock" or temporarily lock the flex point 904 of the living hinge in a straight or substantially straight position, thus locking or temporarily locking the container in a substantially open position, which may be performed prior to, during, or after filling. If collapsing of the container is desired for dispensing the contents therein, or for any other reason, the slide portion 908 may be uncoupled from the locks or notches 906 of the base portion 902 and slid out of the "locked" position, thereby permitting the base portion to once again flex at flex point 904 and the container to collapse.

FIG. 10A illustrates one embodiment of a container 1000 of the present disclosure with a locking mechanism 900 attached thereto, and in the unlocked position, thus permitting the container to fold along pre-folds 1002. FIG. 10B illustrates the container 1000 with the locking mechanism 900 in the "locked" position, thus preventing the container from substantially folding along pre-folds 1002 significantly. The locking mechanism 900 may be attached, molded to, or otherwise secured to the container 1000 utilizing any suitable means. As discussed above, and as may be appreciated from FIGS. 10A and B, in some embodiments of the present disclosure, container 1000 may be generally similar to that of container 100, but the top panel or portion of the container may be divided into two or more separate portions. In the embodiment illustrated in FIGS. 10A and B, the top panel is bisected into two sloping portions 1004 and 1006 or bisected such that at least one portion 1004 is sloping. Of course, any other suitable configuration may be used. Container 1000, or any embodiments herein, may also include a handle 1008, as illustrated in FIGS. 10A and B, which may be manufactured from any suitable materials and attached by any suitable means.

In another embodiment, for example, with reference back to FIG. 6, a locking mechanism 610 may include one or more tabs or slots 612. The tabs 612 may be molded or otherwise secured onto the container. A separate brace 614 may be provided, and after expansion or inflation of the container, the brace ends 616 may be inserted into the tabs 612, such that the brace supports the container in its expanded state and substantially prevents the container from collapsing significantly. If collapsing of the container is desired for dispensing the contents therein, or for any other reason, the brace 614 may be removed from the tabs 612, thereby permitting the container to collapse. As a further note, in other embodiments, another brace may be utilized in a similar manner to keep the container in a collapsed state, which could be desirable during shipping because it may keep the container in a smaller, flattened state.

In yet another embodiment, for example, a base cup or chime may be provided and attached or otherwise secured to the bottom of an expanded container. The base cup or chime may be configured or designed so as to substantially prevent the pre-folds from bending or folding significantly while the base cup is attached. If collapsing of the container is desired for dispensing the contents therein, or for any other reason, the base cup or chime may be removed, thereby permitting the container to collapse. Some embodiments of a base cups or chimes that may be suitable for the base cup or chime of the present disclosure, include but are not limited to, those disclosed in International PCT Appln. No. PCT/US11/55558, which was previously incorporated by reference herein.

Figure 11:
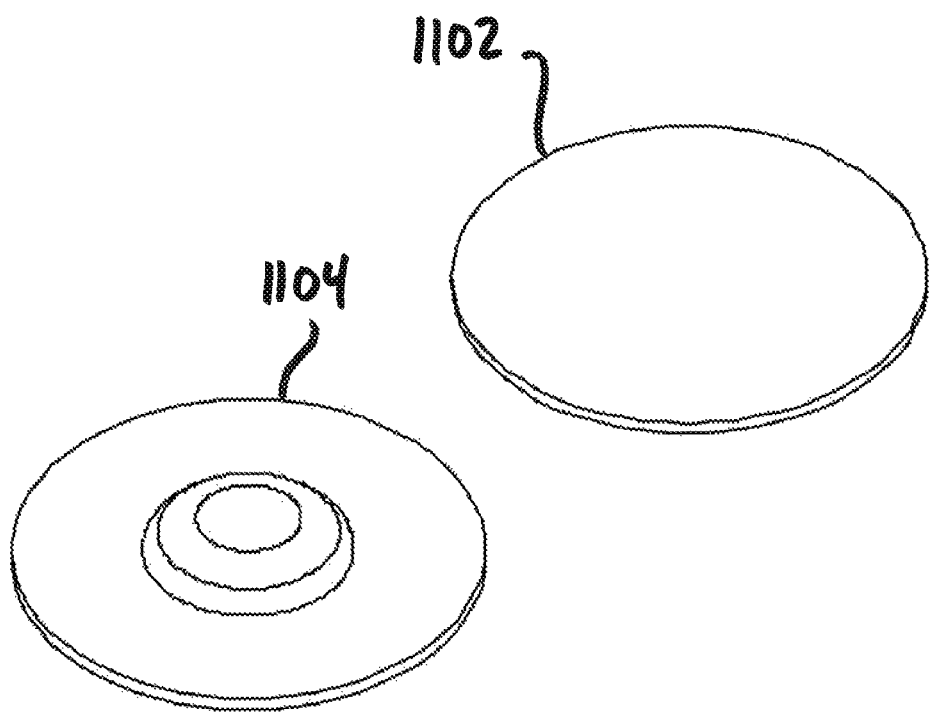
FIG. 11 illustrates a locking mechanism in accordance with another embodiment of the present disclosure in an unlocked position.

In still another embodiment, for example, illustrated in FIG. 11, one or more locking disks 1102, and/or disks with dome-shaped structures 1104, may be provided and mounted or otherwise secured to one or more bending points or regions of the container, respectively, such as where pre-folds are located or where multiple pre-folds intersect. The disks 1102, 1104 may be configured or designed so as to substantially prevent the pre-folds from flexing or folding significantly at the bending points, unless a significant force was applied to overcome the bending moment of the disks. Embodiments of the disks with dome-shaped structures may have an increased bending moment over those without dome-shaped structures. The positioning of one or more of such disks 1102, 1104 may be selected based on which bending points of the container are likely to provide good, or even the most, prevention of overall collapsing. However, the positioning of the disks 1102, 1104 may be selected using any suitable means, including random positioning. If collapsing of the container is desired for dispensing the contents therein, or for any other reason, the disks 1102, 1104 may be removed, moved, adjusted, etc. so as to permit flexing at the bending points, thereby permitting the container to collapse.

Figure 12:
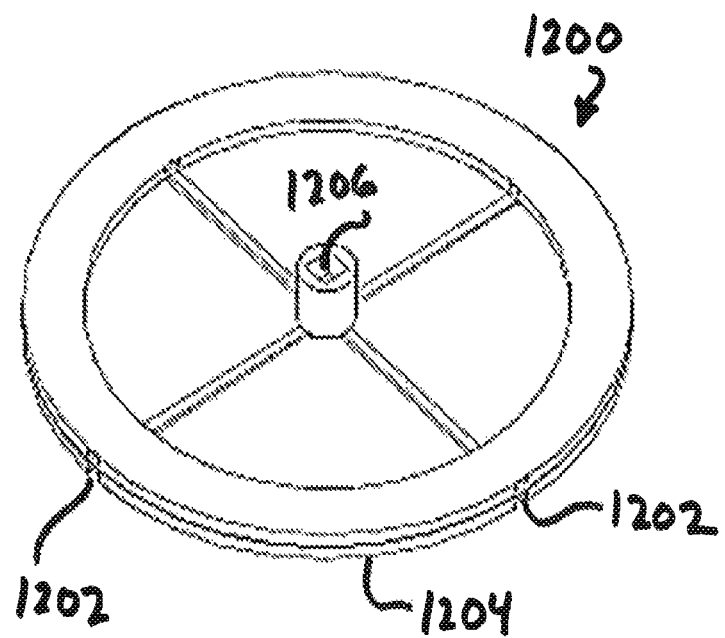
FIG. 12 illustrates a locking mechanism in accordance with yet another embodiment of the present disclosure in an unlocked position.

In yet another embodiment, for example, illustrated in FIG. 12, one or more rotating disks 1200 may be provided and mounted or otherwise secured to one or more bending points or regions of the container, respectively, such as where pre-folds are located or where multiple pre-folds intersect. The rotating disks 1200 may include thinned or weakened areas 1202, which have a lower bending moment and permit flexing, and other areas 1204 that are substantially more rigid. In a collapsed state, the rotating disks 1200 may be rotated, around axis 1206, such that the thinned or weakened areas 1202 are substantially or completely aligned over the pre-folds so as to permit the pre-folds to flex and bend and the container to collapse. In an expanded state, the rotating disks 1200 may be may be rotated such that the more rigid areas 1204 are substantially or completely aligned over the pre-folds so as to substantially prevent the pre-folds from flexing or bending significantly at the bending points. The positioning of one or more of rotating disks 1200 may be selected based on which bending points of the container are likely to provide good, or even the most, prevention of overall collapsing. However, the positioning of the rotating disks 1200 may be selected using any suitable means, including random positioning. If collapsing of the container is desired for dispensing the contents therein, or for any other reason, the rotating disks 1200 may be rotated such that the thinned or weakened areas 1202 are again substantially or completely aligned over the pre-folds or, in some embodiments, if designed as such, the rotating disks may be removed, moved, adjusted, etc. so as to permit flexing at the bending points. Although bisecting orthogonal thinned or weakened areas are illustrated in the figures, other designs, configurations, or patterns may be utilized, and may depend on, for example but not limited to, the number and configuration of pre-folds in the container, the selected bending points, the material and size of the rotating disks, etc.

The locking mechanisms disclosed herein may be manufactured from any suitable materials, including but not limited to, plastics, thermoset plastics, nylons, or other natural or synthetic polymers, rubbers, etc. Furthermore, although specific embodiments of locking mechanisms, devices, or features have been described herein, it will be understood that other locking mechanisms, devices, or features may be utilized to help prevent the containers of the present disclosure from collapsing significantly once filled, if desired, and are considered within the scope of the present disclosure.

When it is desired to dispense the contents of the container, the contents may be removed through the port of the container. In some embodiments, the port of the container may include connectors and/or caps for dispense and/or shipping and storage. Examples of connectors and caps that may be used with the embodiments of the present disclosure are described in International PCT Appln. No. PCT/US11/55558; U.S. Patent Application No. 60/813,083 filed on Jun. 13, 2006; U.S. Patent Application No. 60/829,623 filed on Oct. 16, 2006; PCT Application Number PCT/US07/70911, entitled "Liquid Dispensing Systems Encompassing Gas Removal," with an international filing date of Jun. 11, 2007 and U.S. Patent Application No. 60/887,194 filed on Jan. 30, 2007, each of which is hereby incorporated herein in its entirety.

The contents of the container may be dispensed by any suitable method. For example, for some applications, the contents may be dispensed by simply pouring the contents out of the container. For other applications, the contents of the container may be dispensed by direct or indirect pressure dispense, direct or indirect pressure-assisted pump dispense, or pump dispense, for example. In applications using pressure dispense or pressure-assisted pump dispense, the container may collapse upon emptying of the contents. Embodiments of containers of the present disclosure, in some cases, may be dispensed at pressures less than about 100 psi, or more preferably at pressures less than about 50 psi, and still more preferably at pressures less than about 20 psi, and in some cases, the contents of the containers of some embodiments may be dispensed at significantly lower pressures, as described in this disclosure. For example, in some embodiments, the folds in the container may act like hinges that permit the container to collapse at very low pressures. In some embodiments, the folds may permit the container to collapse at pressures down to approximately 3 psi. In some embodiments, these containers may achieve up to about 99.95% dispensability.

In indirect pressure dispense applications, there will typically be a pressure vessel in which the container having the desired material is placed. The space between the pressure vessel and the container is filled with a fluid or gas in order to pressurize the vessel and dispense the contents of the container. Traditional flexible liner-based systems often include and are shipped with a rigid overpack, acting as the pressure vessel. Since such systems typically require the overpack to be shipped with the flexible liner, transportation costs are increased due to the inefficiencies of the traditional rigid overpacks, as discussed in detail above. Advantageously, embodiments of the present disclosure, however, do not require an overpack to be shipped with the container because of their rigidity and their free-standing capability. Accordingly, an end user wishing to pressure dispense the contents of the containers of the present disclosure need not bear the cost of shipping an overpack. Instead, the end user may keep one or more pressure vessels at their facility, thereby incurring only the single initial shipping cost for the pressure vessel, and avoiding the need to transport pressure vessels back and forth with the containers. As can be readily recognized, this may result in additional shipping efficiencies over traditional containers. In particular embodiments using indirect pressure dispense, therefore, a rigid collapsible container may be shipped without an overpack and then placed in a pressurizing vessel at the receiving facility in order to pressure dispense the contents of the container. Because the amount of space, or footprint, that may be taken up by some containers of the present disclosure may be the same or smaller than that of a traditional container in some embodiments, currently-used pressure vessels may be used together with the container of the present disclosure to dispense the contents.

Figure 13:
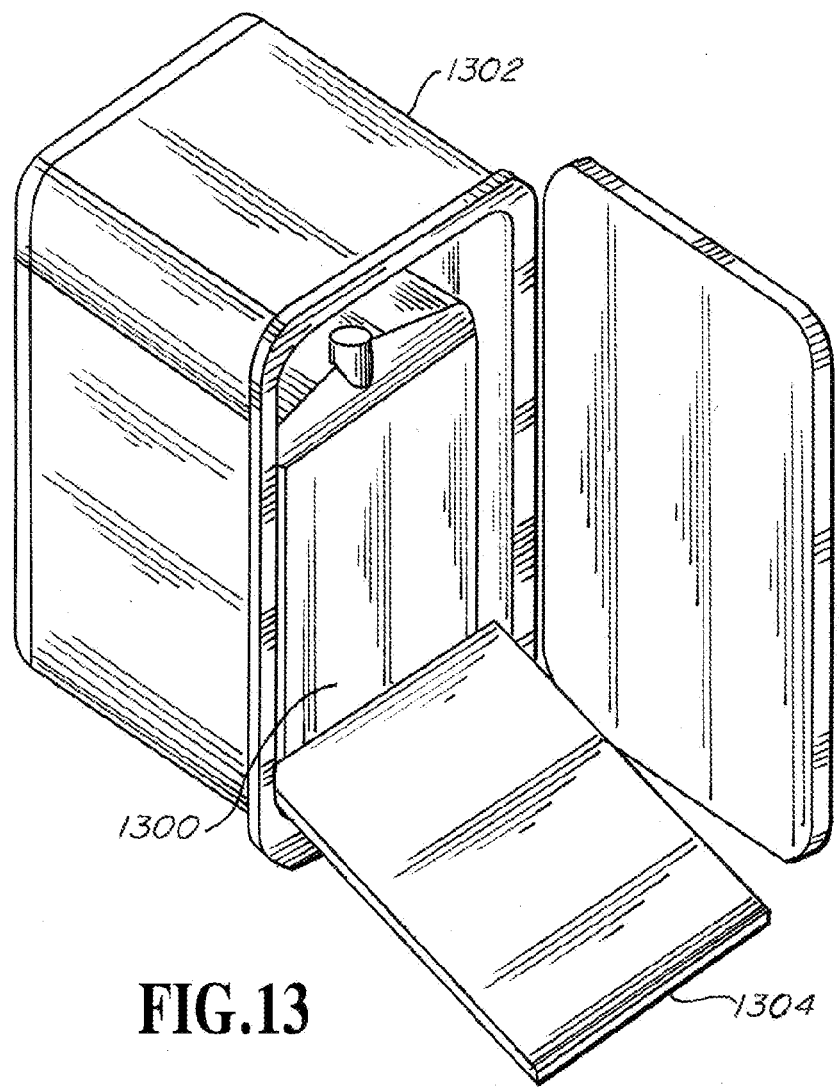
FIG. 13 shows a liner positioned inside of a pressure vessel, in accordance with one embodiment of the present disclosure.

In other embodiments, a pressure vessel may be specifically configured to be used with embodiments of containers of the present disclosure. In a particular embodiment, as may be seen in FIG. 13 for example, a container 1300 of the present disclosure may be positioned in a pressure vessel 1302 for pressure dispense. As stated earlier, because the containers of the present disclosure does not require an overpack for shipping, the filled container 1300 may simply be placed directly into a pressure vessel 1302 for dispense. In some embodiments, the pressure vessel 1302 may include a ramp 1304 that may aide in positioning the container 1300 inside of the pressure vessel 1302. In some embodiments, the ramp 1304 may include a plurality of rollers that may further aide in positioning the container 1300 inside of the pressure vessel 1302. In such an embodiment, any suitable number of rollers, or rows of rollers may be used on the ramp. The rollers may be placed in any suitable configuration on the top surface of the ramp, in some embodiments. The ramp 1304 may be removable permitting the pressure vessel 1302 to be closed. However, in other embodiments, the ramp 1304 may be configured for storage within the pressure vessel 1302, such as but not limited to, by folding into the pressure vessel.

While not necessary or desirable in every embodiment, to aid in dispense, any of the containers of the present disclosure may include a dip tube. Further, any embodiments of the present disclosure may include any of, or any combination of, features, enhancements, or properties such as, but not limited to features to prevent or reduce choke-off, surface features that may be included on one or more surfaces of the liner, multiple layers including barrier layers, coatings, and/or sprays, sleeves that may fit over the exterior of the container, labels, features that may help control the collapse of the container during pressure or pressure-assisted pump dispense in a particular way, and/or handles for transportability, each of which may be further described in detail in PCT Application Number PCT/US11/55558; PCT Application Number PCT/US08/52506, entitled, "Prevention Of Liner Choke-off In Liner-based Pressure Dispensation System," with an international filing date of Jan. 30, 2008; PCT Application Number PCT/US11/55560, titled "Nested Blow Molded Liner and Overpack and Methods of Making Same," filed Oct. 10, 2011; U.S. Pat. No. 7,172,096, entitled "Liquid Dispensing System," issued Feb. 6, 2007; PCT Application Number PCT/US07/70911, entitled "Liquid Dispensing Systems Encompassing Gas Removal," with an international filing date of Jun. 11, 2007; U.S. Pat. No. 6,607,097, titled "Collapsible Bag for Dispensing Liquids and Method," filed Mar. 25, 2002; U.S. Pat. No. 6,851,579, titled "Collapsible Bag for Dispensing Liquids and Method," filed Jun. 26, 2003; U.S. Pat. No. 6,984,278, titled "Method for Texturing a Film," filed Jan. 8, 2002; and U.S. Pat. No. 7,022,058, titled "Method for Preparing Air Channel-Equipped Film for Use in Vacuum Package," filed Jun. 26, 2002, each of which is hereby incorporated herein in its entirety.

In additional embodiments, the various embodiments of containers of the present disclosure may be provided with sensors and/or RFID tags, which may be used to track the assembly, as well as to measure usage, pressure, temperature, excessive shaking, disposition, or any other useful data. The sensors or RFID tags may be active and/or passive. In one embodiment, the sensors or RFID tags may be used to store and track information about the container, including but not limited to, its source or destination, its contents and the source thereof, the total volume, and/or the volume of contents remaining, etc. In other examples, strain gauges may be used to monitor pressure changes of the containers. The strain gauges may be applied or bonded to any suitable component of the containers. The strain gauges may be used to determine pressure build-up in an aging product, but may also be useful for a generally simple measurement of the contents stored in the container. For example, the strain gauge may be used to alert an end user as to any problems with the contents of the container or may be used generally as a control mechanism, such as in applications where the container may be used as a reactor or a disposal system. In embodiments where the sensitivity of the strain gauge is high enough, it may be able to provide a control signal for dispense amount and flow rate.

Although the present invention has been described with reference to preferred embodiments, persons skilled in the art will recognize that changes may be made in form and detail without departing from the spirit and scope of the invention.

We claim:

1. A blow molded container comprising:
a plurality of predetermined fold lines in one or more container walls, the plurality of predetermined fold lines allowing the container walls to flex along the fold lines to an at least partially collapsed state and unfold along the fold lines to a shape of predetermined volume; and
a locking mechanism for locking, at least temporarily, the container walls in the unfolded state, the locking mechanism comprising a base portion comprising a living hinge and a slide portion operably attached thereto, the slide portion slidable along the base portion from an unlocked position, permitting the base portion to flex at the living hinge, to a locked position which substantially prevents the base portion from flexing at the living hinge.

2. The container of claim 1, wherein the container walls comprise at least one of polyethylene terephthalate (PET), polyethylene naphthalate (PEN), poly(butylene 2,6-naphthalate) (PBN), polyethylene (PE), linear low-density polyethylene (LLDPE), low-density polyethylene (LDPE), medium-density polyethylene (MDPE), high-density polyethylene (HDPE), and polypropylene (PP).

3. The container of claim 1, wherein two opposing side walls comprise predetermined fold lines that upon collapse of the container, cause the opposing side walls to fold inward.

4. The container of claim 3, further comprising a top wall, wherein in an unfolded state, has at least a portion that is configured in an incline slope relative the bottom wall of the container.

5. The container of claim 4, further comprising a fitment port positioned on the inclined slope of the top wall.

6. A blow molded container comprising:
a plurality of panel walls abutting one another along predetermined fold lines, the plurality of panel walls substantially forming a container of nearly cylindrical shape with nearly domed ends;
a fitment port positioned at the top of the container and aligned with a central axis of the container; and
a locking mechanism for locking, at least temporarily, the container in the unfolded state, the locking mechanism comprising a substantially rigid base cup removably attachable to the panel walls, the rigidity of the base cup substantially preventing the panel walls from significantly collapsing along the predetermined fold lines;
wherein the plurality of predetermined fold lines permit the container walls to flex along the fold lines to an at least partially collapsed state and unfold along the fold lines into the nearly cylindrical shape with nearly domed ends, and wherein the predetermined fold lines run generally vertically along the container.

7. The container of claim 6, wherein the predetermined fold lines alternate between flexing convexly and concavely with respect to the central axis of the container, thereby permitting the container to collapse axially.

8. A blow molded container comprising:
a plurality of predetermined fold lines in one or more container walls, the plurality of predetermined fold lines allowing the container walls to flex along the fold lines to an at least partially collapsed state and unfold along the fold lines to a shape of predetermined volume; and
a locking mechanism for locking, at least temporarily, the container walls in the unfolded state, the locking mechanism comprising one or more tabs on the container and a substantially rigid brace insertable into the tabs such that the brace supports the container in its unfolded state and substantially prevents the container from collapsing significantly.

9. The container of claim 8, wherein the container walls comprise at least one of polyethylene terephthalate (PET), polyethylene naphthalate (PEN), poly(butylene 2,6-naphthalate) (PBN), polyethylene (PE), linear low-density polyethylene (LLDPE), low-density polyethylene (LDPE), medium-density polyethylene (MDPE), high-density polyethylene (HDPE), and polypropylene (PP).

10. The container of claim 8, wherein two opposing side walls comprise predetermined fold lines that upon collapse of the container, cause the opposing side walls to fold inward.

11. The container of claim 10, further comprising a top wall, wherein in an unfolded state, has at least a portion that is configured in an incline slope relative the bottom wall of the container.

12. The container of claim 11, further comprising a fitment port positioned on the inclined slope of the top wall.

13. A blow molded container comprising:
a plurality of predetermined fold lines in one or more container walls, the plurality of predetermined fold lines allowing the container walls to flex along the fold lines to an at least partially collapsed state and unfold along the fold lines to a shape of predetermined volume; and
a locking mechanism for locking, at least temporarily, the container walls in the unfolded state, the locking mechanism comprising a rotating disk located along at least one pre-fold, the disk having at least one substantially rigid area and at least one weakened area, wherein when the rotating disk is rotated such that the at least one substantially rigid area is aligned with the at least one pre-fold, the disk substantially prevents the at least one pre-fold from flexing significantly at the location of the disk.

14. The container of claim 11, wherein the container walls comprise at least one of polyethylene terephthalate (PET), polyethylene naphthalate (PEN), poly(butylene 2,6-naphthalate) (PBN), polyethylene (PE), linear low-density polyethylene (LLDPE), low-density polyethylene (LDPE), medium-density polyethylene (MDPE), high-density polyethylene (HDPE), and polypropylene (PP).

15. The container of claim 11, wherein two opposing side walls comprise predetermined fold lines that upon collapse of the container, cause the opposing side walls to fold inward.

16. The container of claim 15, further comprising a top wall, wherein in an unfolded state, has at least a portion that is configured in an incline slope relative the bottom wall of the container.

17. The container of claim 16, further comprising a fitment port positioned on the inclined slope of the top wall.

\* \* \* \* \*